United States Patent
Yamaguchi et al.

(10) Patent No.: US 7,245,401 B2
(45) Date of Patent: Jul. 17, 2007

(54) DEVICE AND METHOD FOR RECORDING ADDITIONAL INFORMATION ON PRINTING MEDIUM, AND IMAGE FORMING APPARATUS

(75) Inventors: Shoji Yamaguchi, Ashigarakami-gun (JP); Mario Fuse, Ashigarakami-gun (JP); Tetsuya Kimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 970 days.

(21) Appl. No.: 10/376,236

(22) Filed: Mar. 3, 2003

(65) Prior Publication Data

US 2004/0066522 A1 Apr. 8, 2004

(30) Foreign Application Priority Data

Sep. 20, 2002 (JP) .............................. 2002-275399

(51) Int. Cl.
*G06F 3/12* (2006.01)
*G06K 1/12* (2006.01)
*G06K 19/06* (2006.01)

(52) U.S. Cl. ...................... 358/3.28; 358/1.1; 235/493; 283/82

(58) Field of Classification Search ................. 358/1.1, 358/1.9, 3.28; 283/82; 235/493; 380/51, 380/54, 55

See application file for complete search history.

(56) References Cited

U.S. PATENT DOCUMENTS 5,863,076 A * 1/1999 Warther ....................... 283/74
6,639,688 B2 * 10/2003 Imai ........................... 358/1.14
6,776,438 B2 * 8/2004 Lee .............................. 283/82
7,116,222 B2 * 10/2006 Sills et al. ............. 340/539.22

FOREIGN PATENT DOCUMENTS

| JP | A 6-212123 | 8/1994 |
|----|------------|--------|
| JP | A 6-239078 | 8/1994 |
| JP | A 7-76196 | 3/1995 |
| JP | A 7-503061 | 3/1995 |
| JP | A 8-185496 | 7/1996 |
| JP | A 9-295484 | 11/1997 |
| JP | A 2001-197297 | 7/2001 |

* cited by examiner

*Primary Examiner*—Thomas D. Lee
(74) *Attorney, Agent, or Firm*—Oliff & Berridge, PLC

(57) ABSTRACT

A secrecy management information recording device has an information input section which inputs image information printed by a printer and secrecy management information corresponding to the image information, a transport mechanism which receives a printing sheet on which the image information has been printed by the printer, and discharges the sheet after passage over a heat generating resistor, and a magnetic tag forming section which controls generation of heat by the heat generating resistor according to content of the secrecy management information corresponding to the image information printed on the transported printing sheet to thermally transfer at least one magnetic member contained in a thermal transfer sheet onto the printing sheet. A magnetic tag representing the content of the secrecy management information is thereby formed on the printing sheet. This device records additional information corresponding to image information on a printing medium at the time of copying of the image information to the printing medium in such a manner that the additional information is remotely readable.

26 Claims, 15 Drawing Sheets

DEVICE AND METHOD FOR RECORDING ADDITIONAL INFORMATION ON PRINTING MEDIUM, AND IMAGE FORMING APPARATUS

BACKGROUND OF THE INVENTION

1. Field of the Invention

The present invention relates to a recording apparatus which adds information other than image information to be printed on a printing medium. More particularly, the present invention relates to a device and method which enable additional information corresponding to image information to be remote-readably recorded in a state of being combined with the image information when the image information is printed on a printing medium output from an image forming apparatus such as a printer, a copying machine, or a platemaking apparatus having a printing mechanism for recording information on a printing medium such as paper using toner or ink.

2. Description of the Related Art

Known techniques for preventing a leak of information from confidential documents include, for example, a method of using a printing medium on which a latent image is formed in advance (see, for example, Japanese Patent Laid-Open Publication Nos. Hei 9-295484, 6-212123, 6-239078, and 7-76196) and a method of using an electronic latent image, i.e., a method in which a latent image is formed together with image information when a confidential document is formed, and the latent image becomes visible on a printing medium as well as the document when the confidential document is copied (see, for example, Japanese Patent Laid-Open Publication No. 2001-197297). If such a latent image is used in a confidential document, an unauthorized copy made from the confidential document can be easily discriminated.

The method of using a latent image, however, is effective only when a copy is made can be visually inspected. If an unauthorized copy is put in a bag or the like or inserted between other documents such that the copy cannot be seen, the copy of the confidential document can be removed. Thus, the method of using a latent image has a problem in terms of maintenance of secrecy.

A technique for remotely sensing commodity products by attaching a magnetic material to commodity products and using magnetostrictive vibration or the large Barkhausen effect is known (see, for example, National Publication of International Patent Application No. Hei 7-503061 and Japanese Patent Laid-Open Publication No. Hei 8-185496). This technique is utilized in stores where compact discs or the like are sold. That is, unless certain processing is performed on an article to prevent emission of a magnetic field from the article when the article is brought out of a store, a magnetic field emitted from the article is remotely sensed by a magnetic material sensor placed at an exit of the store to issue a warning. Unauthorized removal of the article is thereby prevented. If this technique is used, a confidential document can be remotely sensed by a magnetic material sensor even when it is put in a bag. However, if a copy of the confidential document is made, unauthorized removal cannot be detected since no magnetic material is added to the copy.

The existence of a confidential document to which a magnetic material is added can be remotely detected, as described above. The above-described sensing technique is therefore considered effective in preventing information leakage. However, no means has been provided to enable on-demand addition of a magnetic material to a copy.

SUMMARY OF THE INVENTION

The present invention advantageously solves the above-described problem of the conventional art, and provides a device and method for recording additional information on a printing medium and an image forming apparatus which enable remotely-readable additional information corresponding to image information to be recorded on a printing medium when a copy of the image information is made on the printing medium.

To achieve the above-described advantage, according to one aspect of the present invention, there is provided a device for recording additional information on a printing medium, the device having information input means for inputting image information processed by an image forming apparatus to be printed, and additional information corresponding to the image information; and additional information forming means for forming, on the printing medium on which the corresponding image information is printed, a magnetic tag according to a content of the additional information input by the information input means, wherein the additional information corresponding to the image information is remotely readable from the magnetic tag recorded on the printing medium.

According to the present invention, additional information corresponding to image information can be attached to a printing medium on which the image information is printed. In this manner, additional information set with respect to image information (original) can be attached to a copy (printing medium) each time a copy is made.

Because the content of the additional information is stored as a magnetic tag, the additional information is remotely readable.

The above-described additional information forming means may express content of the additional information through control of a magnetic field from at least one magnetic members contained in the magnetic tag or through the placement of the magnetic member.

The above-described additional information forming means may form the magnetic tag such that the magnetic tag can be remotely sensed through magnetostrictive vibration accompanying resonance at a frequency set in the magnetic member.

Alternatively, the above-described additional information forming means may form the magnetic tag such that a pulsed magnetic field generated from the magnetic member by a large Barkhausen effect can be remotely sensed.

The above-described additional information forming means may determine a position at which the magnetic tag is formed on the printing medium based on the position on the printing medium at which the image information input by the information input means is printed.

When a magnetic tag indicating content of the additional information is formed on the printing medium, the image information can be referred to, as described above. Therefore, a suitable position at which the magnetic tag can be formed can be determined so as to avoid an overlap on the image information printing position.

The above-described additional information forming means may form a magnetic tag on the reverse surface of the printing medium.

The above-described additional information recording device may further have dummy pattern forming means for forming a dummy pattern of at least one magnetic member on the printing medium based on the placement of the magnetic member on the printing medium.

This dummy pattern forming means can make unnoticeable the magnetic tag formed on the printing medium.

The above-described additional information forming means may have a thermal transfer sheet containing at least one magnetic member, and a transfer mechanism which transfers the magnetic member contained in the thermal transfer sheet onto the printing medium in a placement pattern according to content of the additional information.

The above-described thermal transfer sheet may have a multilayer structure formed by a sheet base layer, a heat-fusible layer, and an adhesive layer in which the magnetic member is provided.

The above-described thermal transfer sheet may be divided into regions having boundaries defined at predetermined intervals in the printing medium transport direction and perpendicular to the printing medium transport direction, at least one magnetic member being contained in each divided region, the transfer mechanism performing thermal transfer with respect to each divided region.

The above-described transfer mechanism may express content of the additional information by thermally transferring magnetic members at least one of which has a different length onto the printing medium.

The above-described thermal transfer sheet may contain magnetic members at least one of which has a different length.

The above-described transfer mechanism may express content of the additional information by thermally transferring magnetic members at least one of which has a different direction onto the printing medium.

The above-described thermal transfer sheet may contain magnetic members at least one of which has a different direction.

Thus, thermal transfer of magnetic members differing in length or in placement direction onto the printing medium is made possible, so that additional information expressed by a plurality of bits can be attached to the printing medium.

The above-described magnetic member may be formed by a thin wire.

The above-described magnetic member may alternatively be formed by a thin film.

The above-described magnetic member may alternatively be formed by at least two magnetic materials differing in coercive force.

The above-described information input means may designate and input the additional information corresponding to the image information to be printed.

Thus, input of additional information corresponding to image information to be printed are made possible, so that additional information can be added at the time of printing to image information to which no additional information has been added.

The above-described additional information forming means may form the magnetic tag on the printing medium by ejecting magnetic ink containing a magnetic material.

The above-described additional information forming means may form the magnetic tag on the printing medium by transferring and fixing magnetic toner containing a magnetic material.

The above-described additional information recording device may be detachably attached to the image forming apparatus.

According to another aspect of the present invention, there is provided an image forming apparatus formed integrally with the above-described device for recording additional information on the printing medium.

According to still another aspect of the present invention, there is provided a method of recording additional information on a printing medium, the method including an information input step of inputting image information processed by an image forming apparatus to be printed, and additional information corresponding to the image information, and an additional information forming step of forming, on the printing medium on which the corresponding image information is printed, a magnetic tag according to content of the input additional information, wherein the additional information corresponding to the image information is remotely readable from the magnetic tag recorded on the printing medium.

In the above-described additional information forming step, the content of the additional information may be expressed through control of a magnetic field from at least one magnetic member contained in the magnetic tag or through the placement of the magnetic member.

In the above-described additional information forming step, the magnetic tag may be formed so as to be remotely sensed through magnetostrictive vibration accompanying resonance at a frequency set in the magnetic member.

In the above-described additional information forming step, the magnetic tag may alternatively be formed such that a pulsed magnetic field generated from the magnetic member by a large Barkhausen effect can be remotely sensed.

In the above-described additional information forming step, a position at which the magnetic tag is formed on the printing medium may be determined based on the position on the printing medium at which the image information input by the information input means is printed.

The above-described method may further include a dummy pattern forming step of forming a dummy pattern of at least one magnetic member on the printing medium based on the placement of the magnetic member on the printing medium.

DESCRIPTION OF THE PREFERRED EMBODIMENTS

Preferred embodiments of the present invention will be described with reference to the drawings. Description will be made by assuming that image information to be printed on a printing medium in each of embodiments described below is a document containing confidential information. Also, additional information corresponding to the image information is assumed to be secrecy management information indicating that the image information is that of a confidential document.

Embodiment 1

Figure 1:
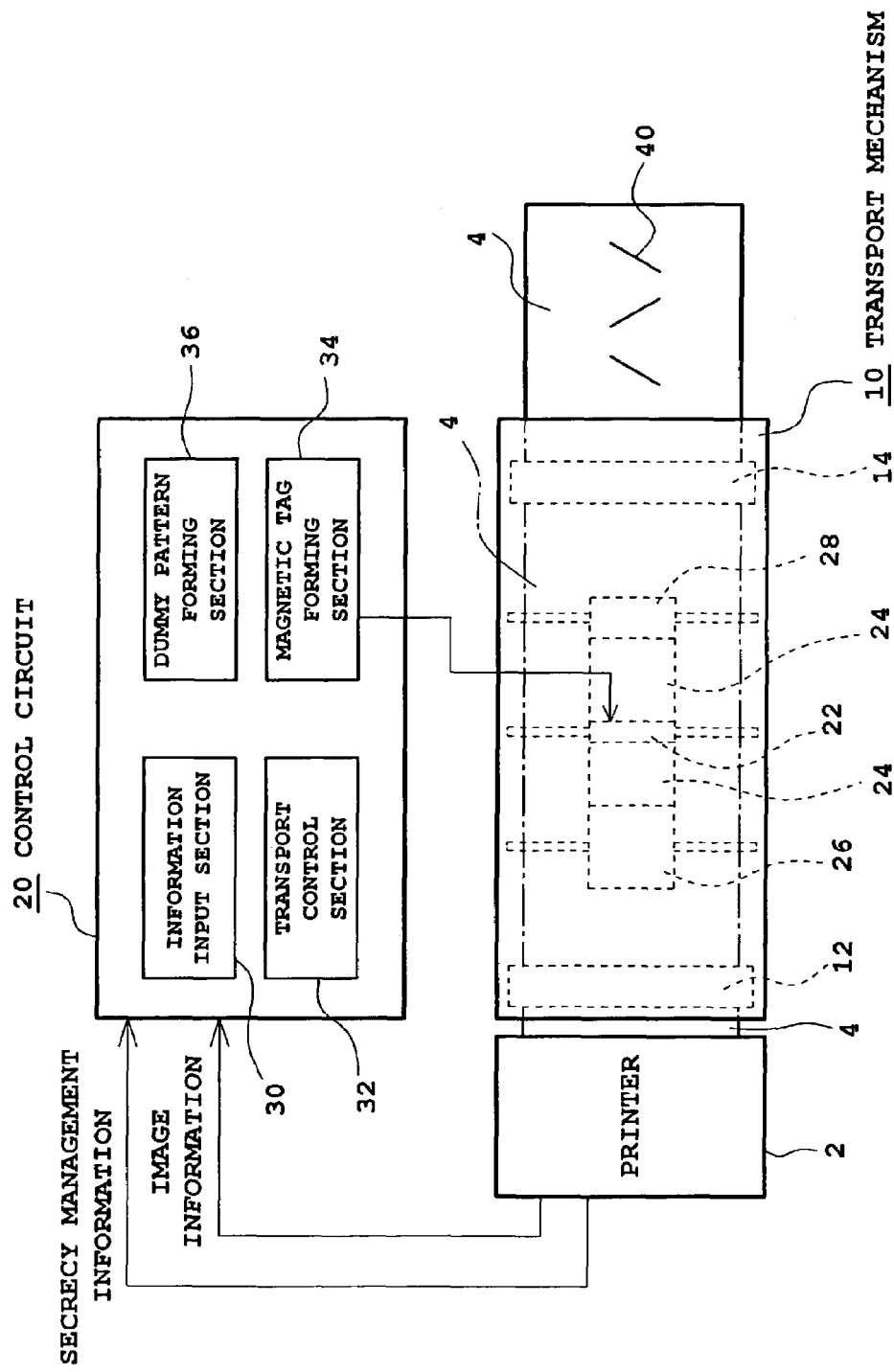
FIG. 1 is diagram showing the configuration of a secrecy management information recording device according to the present invention.
Figure 2:
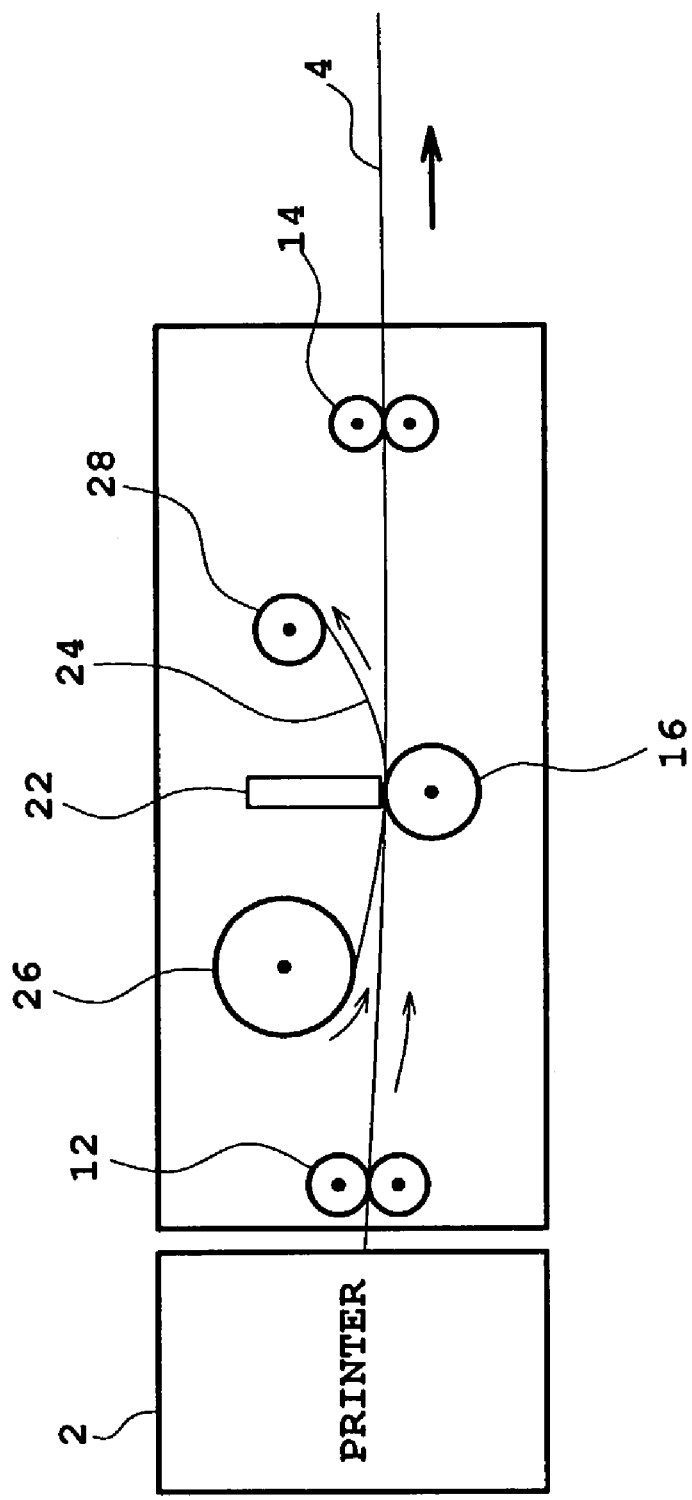
FIG. 2 is a diagram schematically showing the structure of a transport mechanism of the secrecy management information recording device shown in FIG. 1.

FIG. 1 is a diagram showing the construction of a secrecy management information recording device which is an embodiment of an additional information recording device in accordance with the present invention, and which forms additional information, i.e., secrecy management information, as a magnetic tag on a printing sheet. The secrecy management information recording device in this embodiment is mounted on the sheet discharge side of a printer 2 which is an image forming apparatus. The secrecy management information recording device receives a printing sheet 4 discharged from the printer 2, on which image information has been formed, forms secrecy management information on the printing sheet 4 as required, and discharges the printing sheet 4. FIG. 1 illustrates a transport mechanism 10 for transporting sheets, and a control circuit 20 which controls drive of the transport mechanism 10, formation of secrecy management information, and the like. FIG. 2 is a diagram schematically showing the structure of the transport mechanism portion of the additional information recording device. FIG. 1 is a plan view of the mechanism and FIG. 2 is a side view of the mechanism.

Referring to FIGS. 1 and 2, a pair of sheet feed rollers 12 placed in such a position as to face the sheet discharge port of the printer 2 are operated to introduce into the transport mechanism 10 a printing sheet 4 discharged from the printer 2. The pair of sheet discharge rollers 14 discharge the introduced printing sheet 4 from the device. A guide roller 16 is placed at a position facing a heat generating resistor 22 between the pairs of rollers 12 and 14. The printing sheet 4 discharged from the printer 2 passes between the pair of sheet feed rollers 12, between the heat generating resistor 22 and the guide roller 16, and between the pair of sheet discharge rollers 14 to be discharged from the transport mechanism 10. The guide roller 16 is not shown in FIG. 1. Although, for ease of understanding of the sheet 4 transport path, one printing sheet 4 extending from the discharge port of the printer 2 to the discharge portion of the transport mechanism 10 has been illustrated, the relationship between the size of printing sheet 4 and the transport mechanism 10 is not limited to that shown in FIGS. 1 and 2.

In FIGS. 1 and 2 are also illustrated a sheet feed roller 26 around which is wound a thermal transfer sheet 24 of a sufficiently large length containing a magnetic material, and a sheet takeup roller 28 around which is wound one end of the thermal transfer sheet 24. The thermal transfer sheet 24 is fed from the sheet feed roller 26 under drive control performed by the control circuit 20 and is received by the sheet takeup roller 28. While being fed and received, the thermal transfer sheet 24 passes between the heat generating resistor 22 and the guide roller 16 together with the printing sheet 4 under the control of the control circuit 20. Each of the sheet feed roller 26 and the sheet takeup roller 28 is axially supported and mounted so as to be slidable in the axial direction in the transport mechanism 10. The heat generating resistor 22 is mounted so as to be slidable within the transport mechanism 10 along the axial direction of each of the rollers 26 and 28. The sheet feed roller 26, the heat generating resistor 22 and the sheet takeup roller 28 are linked to enable the magnetic material contained in the thermal transfer sheet 24 to be thermally transferred onto the printing sheet 4 at a desired position. The structure of the thermal transfer sheet 24 will be described below in detail.

The control circuit 20 in this embodiment has an information input section 30, a transport control section 32, a magnetic tag forming section 34, and a dummy pattern forming section 36. The information input section 30 handles image information printed by the printer 2 and secrecy management information corresponding to the image information. The transport control section 32 transports a printing sheet 4 discharged from the printer 2 by controlling drive of the transport mechanism 10. The magnetic tag forming section 34 thermally transfers the magnetic material to the printing sheet 4 according to the contents of the secrecy management information by causing the heat generating resistor 22 to generate heat for melting a portion of the thermal transfer sheet 24, while the magnetic tag forming section 34 controls transfer of the thermal transfer sheet 24 by controlling the operations of the sheet feed roller 26 and the sheet takeup roller 28 in cooperation with the transport control section 32. The magnetic tag forming section 34 also determines the magnetic material transfer position with reference to the image information. The magnetic tag forming section 34 thus forms secrecy management information as a magnetic tag on the printing sheet. The dummy pattern forming section 36 forms a dummy pattern of the magnetic material on the printing sheet 4 on the basis of the placement of the magnetic material on the printing sheet 4.

Figure 3:
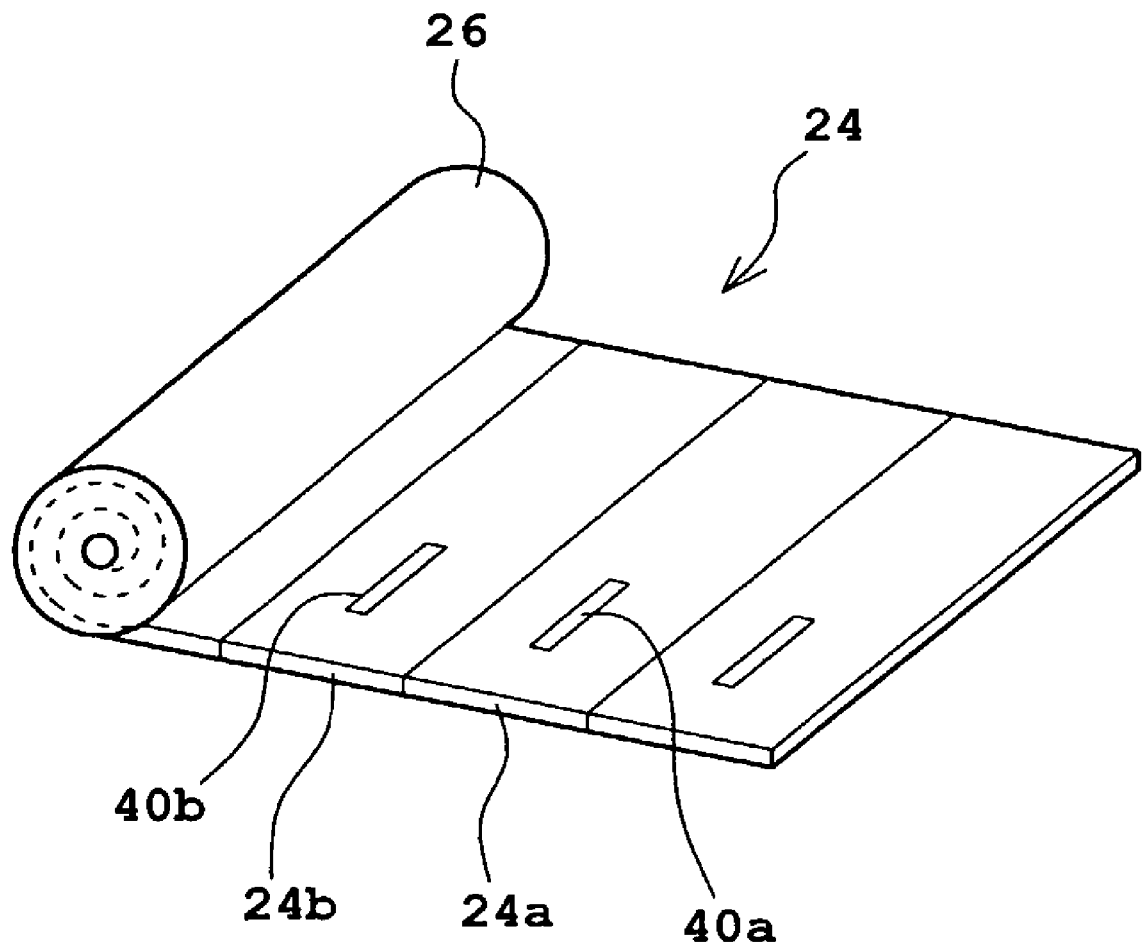
FIG. 3 is a diagram showing the basic structure of a thermal transfer sheet according to an Embodiment 1 of the present invention.
Figure 4:
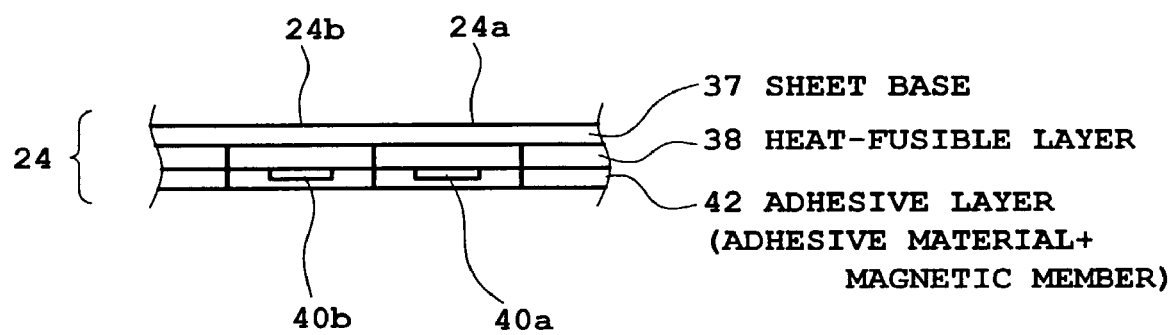
FIG. 4 is a fragmentary enlarged view of the structure of the thermal transfer sheet in Embodiment 1.

FIG. 3 is a diagram showing the basic structure of the thermal transfer sheet 24 wrapped around the sheet feed roller 26. FIG. 4 is a fragmentary enlarged view of the structure of the thermal transfer sheet 24. The structure of the thermal transfer sheet 24 will be described with reference to FIGS. 3 and 4. The thermal transfer sheet 24 is constituted by a sheet base 37, a heat-fusible layer 38 formed of a heat-fusible material, and an adhesive layer 42 formed of a magnetic member 40 and an adhesive material. The heat-fusible layer 38 and the adhesive layer 42 are divided into regions having boundaries defined at predetermined intervals in the sheet transport direction and perpendicular to the sheet transport direction. Because use of the heat generating resistor 22 effects thermal transfer onto the printing sheet 4, it is desirable that the heat-fusible layer 38 and the adhesive layer 42 be divided in advance in correspondence with the width of the heat generating resistor 22. If the thermal transfer sheet 24 is formed in this manner, it is possible for the heat-fusible material to be molten by the heat generating resistor 22 with respect to each divided region. Magnetic members 40a and 40b are respectively contained in the divided regions. While one magnetic member is contained in each divided region in this embodiment, a plurality of magnetic members may be contained in each divided region. If the medium or region contains a plurality of magnetic members, fixed pattern information expressible by the plurality of magnetic members, for example, can be simultaneously formed on the printing sheet 4 by thermal transfer. The magnetic members 40a and 40b shown in FIGS. 3 and 4 are all identical in orientation and in length. To form magnetic members 40, a Co—Fe or Fe—B amorphous metallic material may be used. The intensities per unit area of magnetic fields from magnetic members 40a and 40b are assumed to be equal to each other. An acetate film may be used as the sheet base 37, and an acrylic resin adhesive may be used as the adhesive material.

Figure 5:
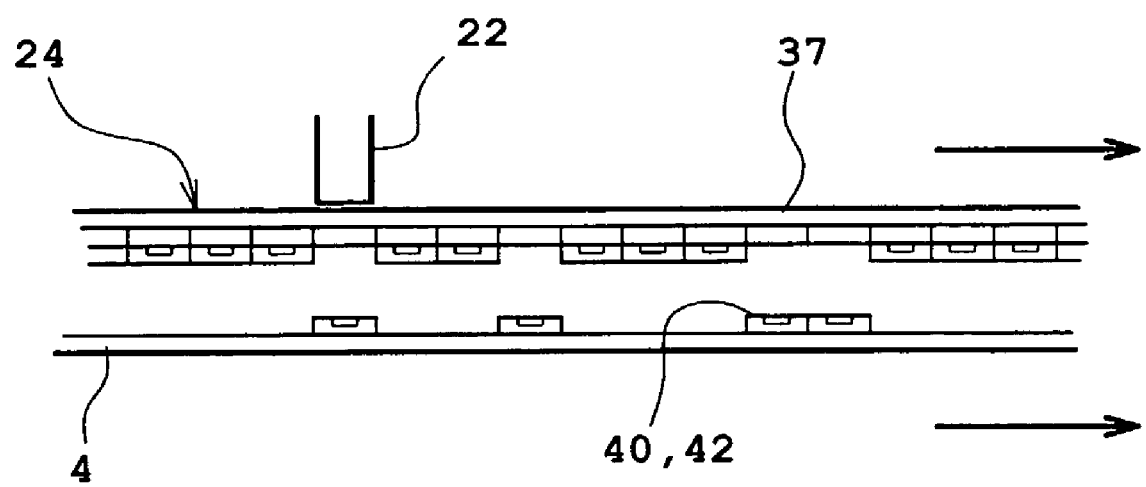
FIG. 5 is a diagram showing a transfer mechanism of Embodiment 1.

Basic processing for thermal transfer of the magnetic member 40 from the thermal transfer sheet 24 to the printing sheet 4 will be described with reference to FIG. 5.

Figure 6:
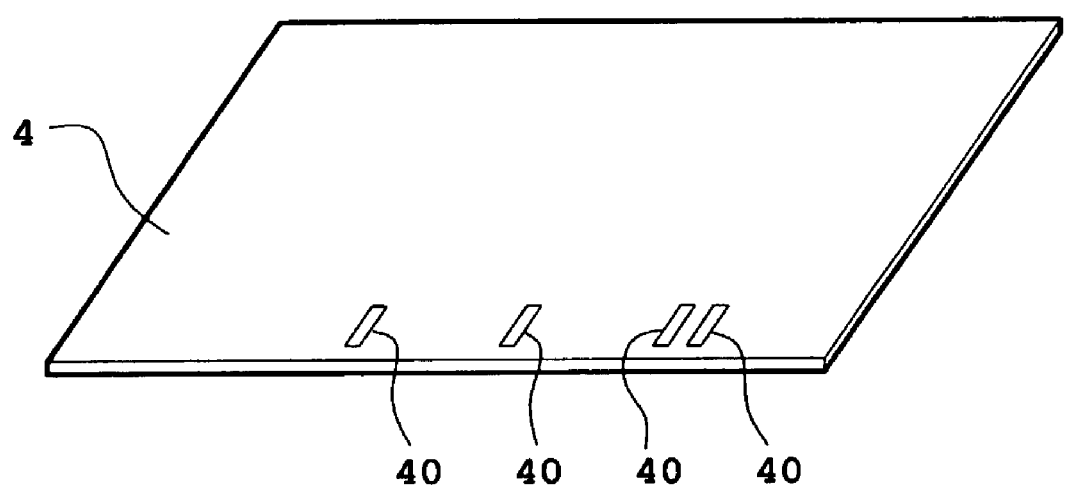
FIG. 6 is a diagram schematically showing a printing sheet on which a magnetic tag is formed by the secrecy management information recording device in Embodiment 1.

In the transport mechanism of the secrecy management information recording device, when a printing sheet 4 on which image information is printed is fed to the position of the heat generating resistor 22 by the sheet feed rollers, the magnetic tag forming section 34 shown in FIG. 1 turns on the heat generating resistor 22 as required on the basis of the contents of secrecy management information corresponding to the printed image information, thereby generating heat. Using the heat thus generated, the heat-fusible layer 38 at the position of the heat generating resistor 22 is molten and the adhesive layer 42 at the position corresponding to the molten heat-fusible layer 38 is separated to adhere to the printing sheet 4 transported in parallel with the thermal transfer sheet 24. Thus, a magnetic tag formed of the magnetic material 40 is formed on the printing sheet 4 by thermally transferring the magnetic material 40 onto the printing sheet 4. FIG. 6 shows the printing sheet 4 on which a magnetic tag is formed by the above-described process.

The operation when secrecy management information is formed on a printing sheet in this embodiment will now be described.

The printer 2 executes printing according to an input printing request. In this embodiment, image information (electronic data) to be printed is identified from a printing request and secrecy management information is added to the image information. The information input section 30 reads the information input to the printer 2, i.e., the image information to be printed and the secrecy management information added to the image information. The arrangement may alternatively be such that image information and secrecy management information may, instead of being read from the printer 2, be directly received from a requester inputting a printing request. When a printing sheet 4 on which the image information has been printed is discharged from the printer 2, the sheet feed rollers 12 feed the printing sheet 4 to the heat generating resistor 22. The magnetic tag forming section 34 causes the heat generating resistor 22 to generate heat as required according to the content of the secrecy management information corresponding to the printed image information, as described above. Using this heat, the magnetic material 40 contained in the thermal transfer sheet 24 is thermally transferred onto the printing sheet 4 to form a magnetic tag on the printing sheet 4. The printing sheet 4 on which the magnetic tag is formed passes the sheet discharge rollers 14 to be discharged out of the secrecy management information recording device. As described above, the secrecy management information corresponding to the image information printed on the printing sheet 4 can be attached to the printing sheet 4.

This embodiment has been described by way of an example wherein the printer 2 is used as the image forming apparatus of the present invention. However, the secrecy management information recording device can also be attached to a multifunctional copying machine. When the copying machine reads image information from an original document and secrecy management information added to the original document, the information input section 30 can receive the image information and the secrecy management information read by the copying machine and attach the secrecy management information to the copy sheet of the original document in the above-described manner.

An application of the present invention may be such that the secrecy management information recording device of this embodiment is provided in a confidential document storage room, and a magnetic tag reader capable of sensing a magnetic field emitted from the magnetic tag is placed at an exit of the document storage room. In the storage room a restored confidential printed documents which have magnetic tags formed on printing sheets by the secrecy management information recording device. When one of the pieces of confidential document printed matter is removed from the document storage room without permission, the magnetic tag reader remotely issues a warning upon sensing the magnetic field generated as a result of excitation of the magnetic tag on the printing sheet 4. The warning may be, for example, a warning light or alarm.

According to this embodiment, even if a confidential document being removed from a location such as a document storage room is a copy, the document or printed sheet can be detected by the magnetic tag reader, and even if the document is hidden in a bag or the like such it cannot be visually recognized. Thus, leaking of confidential information can be simply and more reliably prevented.

The basic arrangement and operation of this embodiment have been described. In a case wherein secrecy management information is flag information indicating whether corresponding image information is a confidential document, a magnetic member 40 for one bit may be thermally transferred to printing sheet 4 using the thermal transfer sheet 24 shown in FIG. 3 and the existence/nonexistence of magnetic member 40 may be sensed by a magnetic tag reader. However, in a case wherein there is a need to attach to printing sheet 4 information expressed by two or more bits, it is not possible to base the system on information recorded using magnetic members 40 arranged in one orientation and equal in length as shown in FIG. 3 because reading of the direction or the distance to the magnetic tag is not consistent. Then, magnetic members 40c, 40d, and 40e of varying lengths are provided in regions of the thermal transfer sheet 24, as shown in FIG. 7A. On the thermal transfer sheet 24, a set of magnetic members 40c, 40d, and 40e differing in length appears repeatedly. The magnetic tag forming section 34 which can recognize the placement of each magnetic member in one of the regions with respect to the length of the magnetic member selects one of the magnetic members 40 having the desired length on the basis of secrecy management information and thermally transfers the selected magnetic member onto printing sheet 4. The intensities of magnetic fields emitted from the magnetic members 40c, 40d, and 40e differing in length vary depending on the distance to a magnetic tag reader. However, the relative differences between the intensities of the magnetic fields from the magnetic members 40c, 40d, and 40e are constant. Therefore, the magnetic tag reader can obtain information of two or more bits. The method of expressing information by these magnetic members will be described below in detail.

Figure 7C:
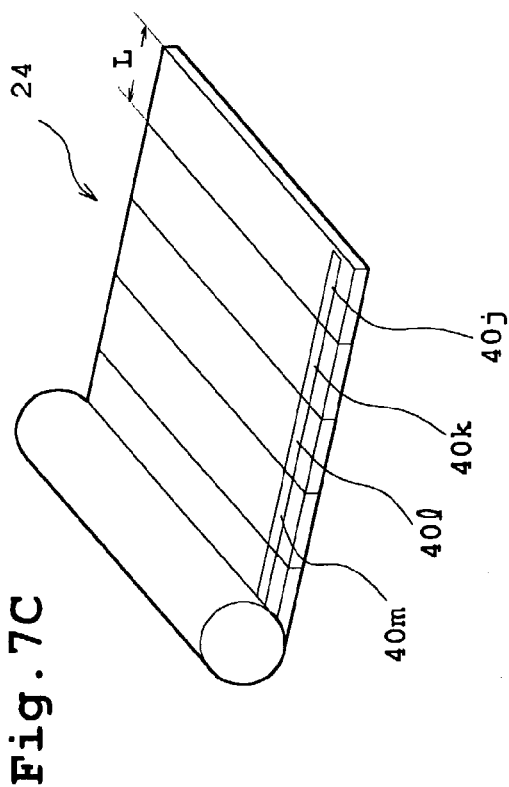
FIGS. 7A to 7C are diagrams showing examples of application of the thermal transfer sheet used in Embodiment 1.
Figure 7A:
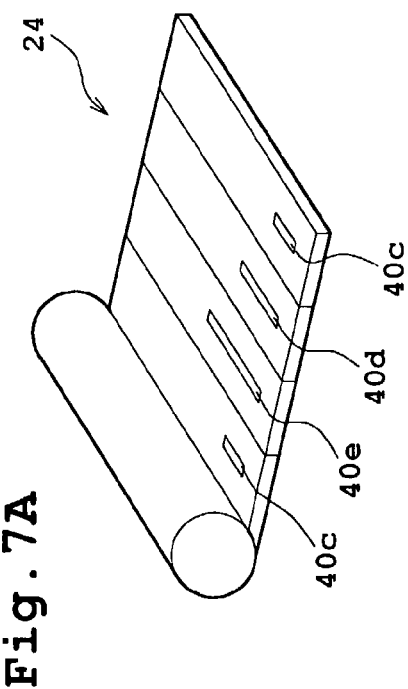
Figure 7B:
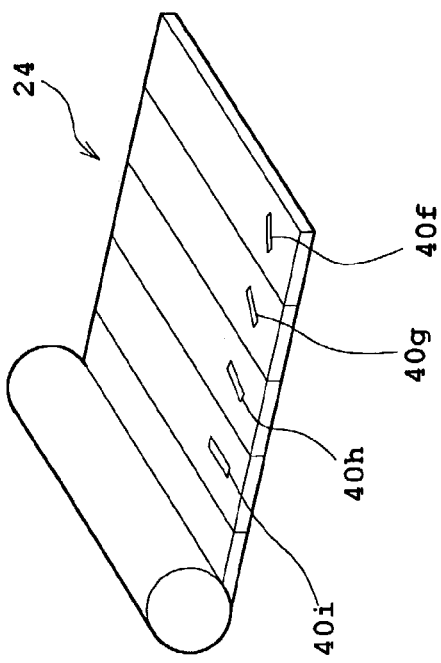

Magnetic members 40f, 40g, 40h, and 40i placed in different orientations, as shown in FIG. 7B, may also be used. In such a case, the intensities of magnetic fields from the magnetic members 40f, 40g, 40h, and 40i read by one magnetic tag reader differ from each other because of the angular differences between the magnetic members, and the magnetic tag reader can obtain information of two or more bits from these tags.

Continuous magnetic members 40j, 40k, 40l, and 40m, as shown in FIG. 7C, may also be used. If the width of each divided region in the thermal transfer sheet 24 is L, and if the magnetic tag forming section 34 thermally transfers only the magnetic member 40j by controlling the heat generating resistor 22, a magnetic member having a length L can be formed. If the magnetic members 40j and 40k are successively thermally transferred, a magnetic member having a length of 2L can be formed. Thus, the length of a magnetic member thermally transferred onto printing sheet 4 can be varied to enable a magnetic tag reader to obtain information of two or more bits.

Figure 8A:
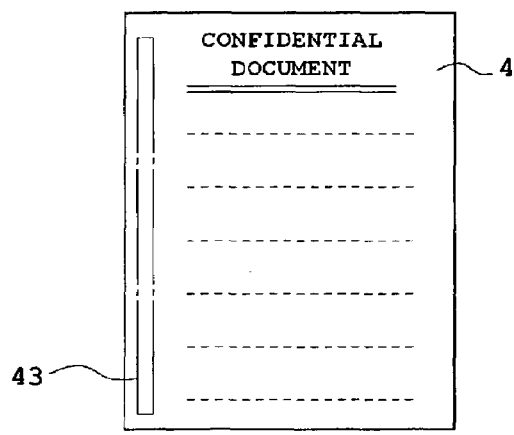
FIGS. 8A to 8C are diagrams showing examples of a magnetic tag placement pattern formed on a printing sheet used in Embodiment 1.

As a location for formation of a magnetic tag on printing sheet 4, a region 43 where no image information is printed as shown in FIG. 8A is preferable because it is possible that the magnetic material, although small in amount, will reduce the print image quality when thermally transferred onto a printed image. In this embodiment, therefore, recognition of the image forming position on the printing sheet, not necessary in processing for attaching secrecy management information to the printing sheet, is enabled by reading the image information with the information input section 30 in order to determine a location for attaching the secrecy management information. It is thus possible for the magnetic tag forming section 34 to determine the magnetic tag formation position on the printing sheet 4 with consideration of image information. A reduction in printed image quality can be avoided by setting the magnetic tag formation position outside the image formation place as described above.

Figure 8B:
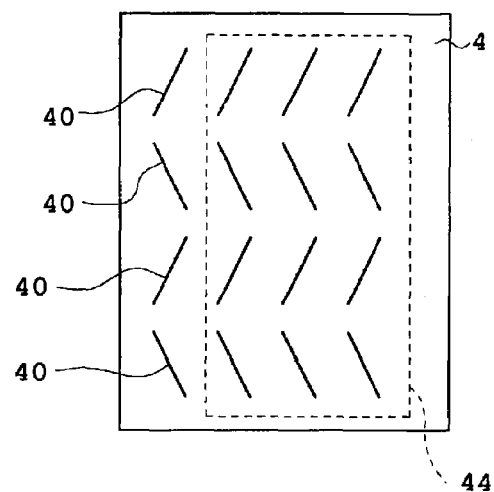

Because of their size, individual magnetic tags are not easily seen. However, their number, thickness, or length, or the pattern in which they are provided, especially if it impairs the appearance of the printed image, may enable someone to notice or perceive the magnetic tag and take countermeasures. In this embodiment, therefore, the dummy pattern forming section 36 is provided to enable printing of a dummy pattern 44, such as shown in FIG. 8B, similar to a pattern in which magnetic members 40 are placed. Such a dummy pattern may be additionally printed so that the magnetic members 40 are formed as part of the entire pattern to avoid impairing the appearance. In such a case, it is difficult to discriminate between the dummy pattern and the pattern in which magnetic tags are placed, making it difficult to visually recognize the magnetic tag. This method ensures a high security level. While an example of use of a dummy pattern 44 similar to a pattern in which magnetic members 40 are placed in this embodiment has been described, it is not necessarily required that the dummy pattern 44 be similar to the pattern in which magnetic tags are placed if the magnetic members 40 can be made unnoticeable. For example, a dummy pattern 44 may be formed as a fixed pattern.

Figure 8C:
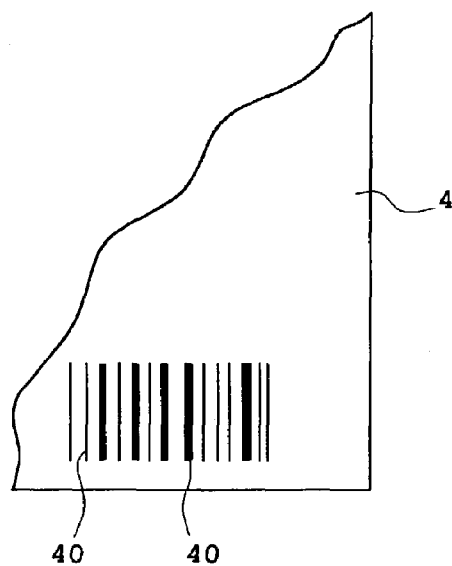

Another possible dummy pattern is such that if a bar code is printed on printing sheet 4 as shown in FIG. 8C, magnetic members 40 are thermally transferred to places between code bars or on top of thick bars to make the magnetic tag less noticeable. A bar code itself may be formed as a dummy pattern. Further, a magnetic tag may be formed by determining, with reference to image information, a position at which the magnetic tag would be less noticeable, e.g., a position on top of a ruled line or where the color of the tag matches that of the printed image.

The dummy pattern forming section 36 prints a dummy pattern on printing sheet 4 with a printing mechanism (not shown) provided in the transport mechanism 10. In this embodiment, the secrecy management information recording device is formed as a single unit and used by being connected to the printer 2. However, if the device is provided in one integral unit including a printer as shown in an embodiment described below, the printing mechanism essentially provided in the printer may be simply used to print a dummy pattern.

Figure 9:
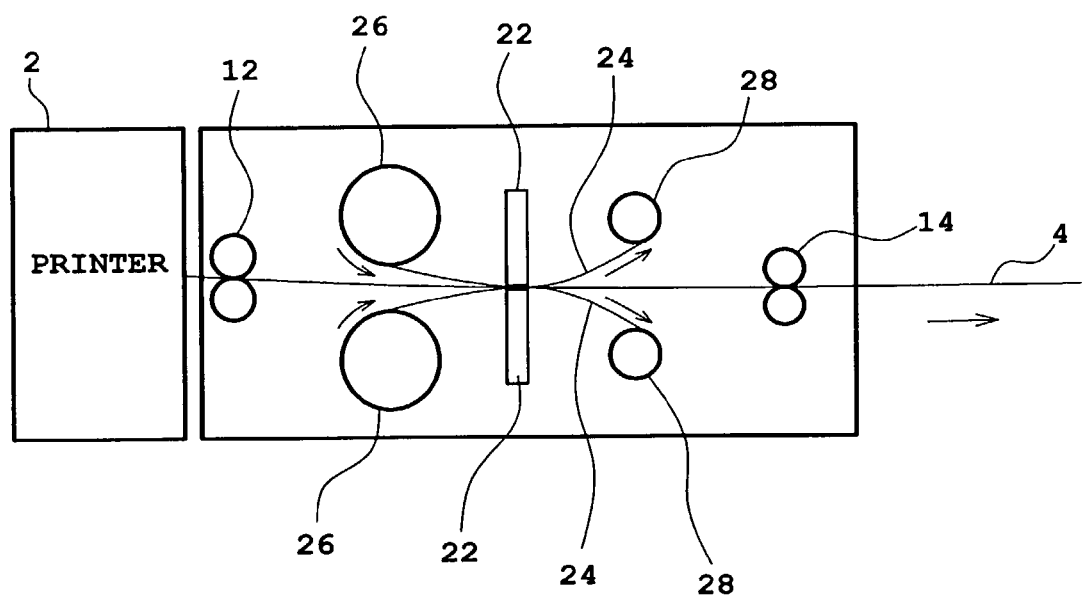
FIG. 9 is a diagram schematically showing another transport mechanism of the secrecy management information recording device of Embodiment 1.

The magnetic tag forming section 34 may also form a magnetic tag in a suitable region on printing sheet 4, for example, in such a position that a reduction in image quality can be prevented, by selecting the position based on image information and secrecy management information. Further, as shown in FIG. 9, if another set of the sheet feed roller 26, the heat generating resistor 22 and the sheet takeup roller 28 is also provided on the reverse surface side of printing sheet 4, a magnetic tag can be formed in such a position, that a reduction in image quality can be prevented, on the printing sheet.

In this embodiment, information according to the content of secrecy management information corresponding to image information printed on printing sheet 4 can be formed as a magnetic tag on printing sheet 4. However, the magnetic tag forming section 34 adjusts the transfer position by timing the transfer with respect to the sheet 4 transport direction in correspondence with the switching on of the heat generating resistor 22. Also, the magnetic tag forming section 34 may adjust the transfer position in the direction perpendicular to the sheet 4 transport direction by moving the sheet feed roller 26, the heat generating resistor 22 and the sheet takeup roller 28 in a linked state in the direction perpendicular to the transport direction (along the axial direction of the rollers 26 and 28). Thus, magnetic material 40 can be thermally transferred to printing sheet 4 at the desired position based on secrecy management information and image information.

In this embodiment, a magnetic tag is positioned in the direction perpendicular to the sheet transport direction by sliding the sheet feed roller 26, the heat generating resistor 22, and the sheet takeup roller 28. However, a structure for magnetic tag positioning other than that described above may be used. For example, a structure may be adopted in which the heat generating resistor 22 is formed so as to cover the entire width of printing sheet 4, and in which only a portion of the heat generating resistor 22 corresponding to a position at which magnetic material 40 is to be thermally transferred to printing sheet 4 is energized to generate heat.

Information of two or more bits can be expressed by varying the lengths of magnetic members 40 to be thermally transferred or the orientations in which the magnetic members 40 are thermally transferred, as mentioned above. Examples of methods of expressing information on printing sheet 4 will now be described.

Figure 10B:
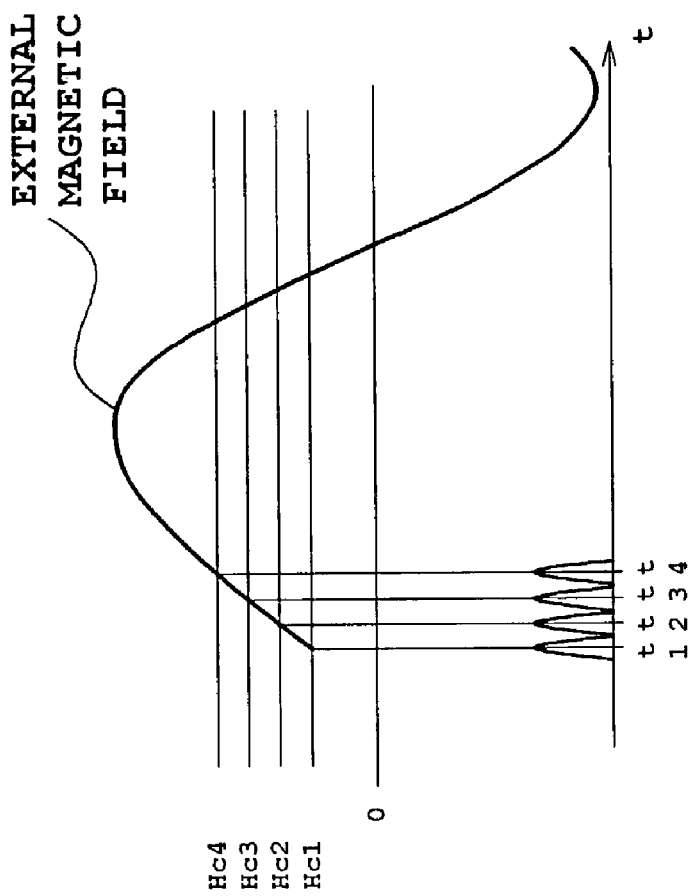
FIGS. 10A and 10B are diagrams showing an example of a magnetic tag formed on a printing sheet and pulsed magnetic fields generated from the magnetic tag placed in a pattern according to Embodiment 1.
Figure 10A:
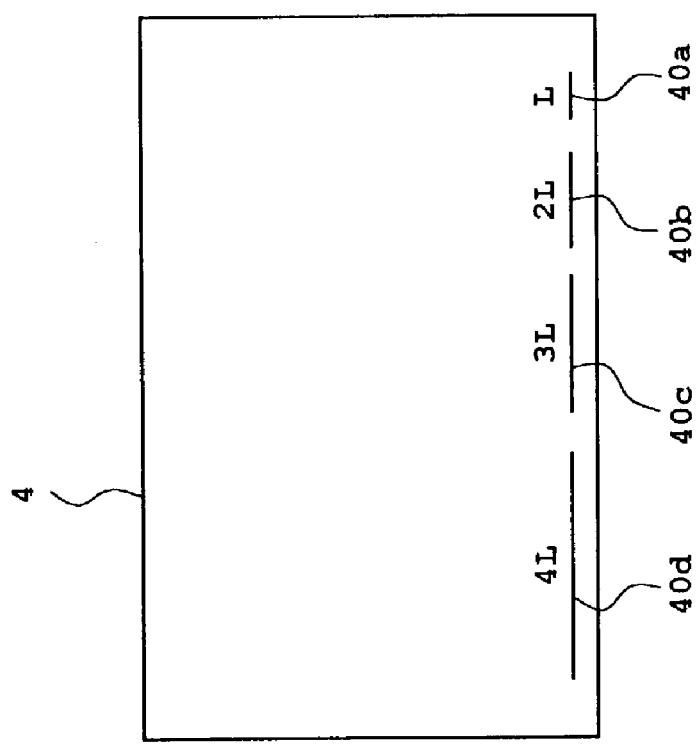

A first method relates to a case wherein the thermal transfer sheet 24 shown in FIG. 7C is used and magnetic members 40*a* to 40*d* having lengths from L to 4L for a magnetic tag are formed on printing sheet 4, as shown in FIG. 10A. When this printing sheet 4 having such magnetic members formed thereon is placed in an alternating magnetic field formed by the magnetic tag reader, each of the magnetic members 40*a* to 40*d* magnetized generates a magnetic field pulse by the large Barkhausen effect. The magnetic members 40*a* to 40*d* on printing sheet 4 generate pulsed magnetic fields with time differences according to their lengths, as shown in FIG. 10B. In the example of four bits shown in FIGS. 10A and 10B, pulse outputs are obtained at different times t1, t2, t3, and t4 by the large Barkhausen effect of the magnetic members 40*d* to 40*a* having lengths 4L, 3L, 2L, and L, respectively. The intensity of the magnetic field from each of the magnetic members 40*a* to 40*d* magnetized by the external magnetic field is influenced by a demagnetizing field. The influence of the demagnetizing field is larger if the element length/element sectional area ratio is lower. If the length of the magnetic members is increased, the demagnetizing factor in the element length direction corresponding to the easy axis of magnetization is reduced by the influence. The magnetization reversal intensity is thereby reduced.

Figures 11A, 11B:
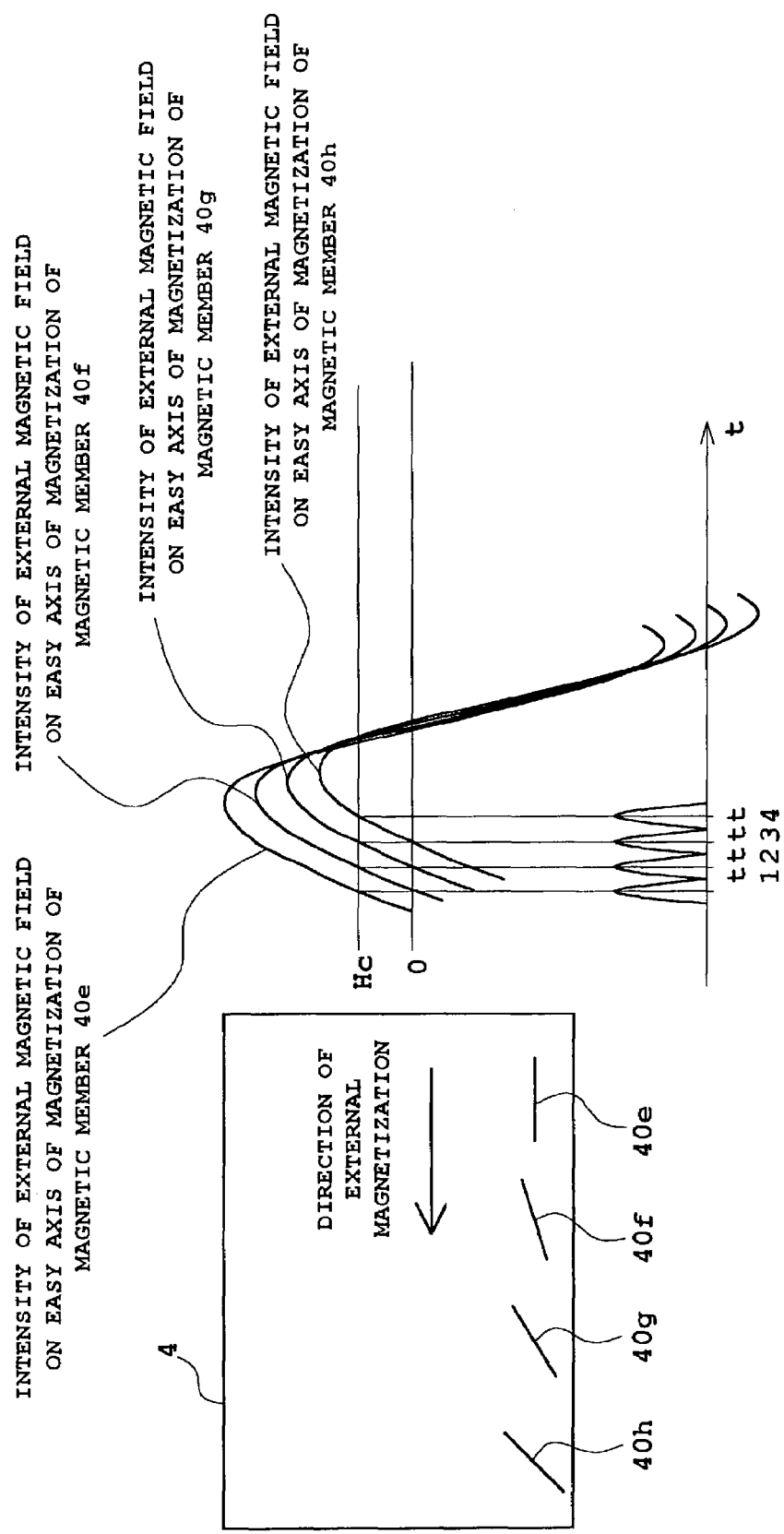
FIGS. 11A and 11B are diagrams showing another example of a magnetic tag formed on a printing sheet and pulsed magnetic fields generated from the magnetic tag placed in a pattern according to Embodiment 1.

The second method relates to a case where the thermal transfer sheet 24 shown in FIG. 7B is used and a magnetic tag consisting of magnetic members 40*e* to 40*h* equal in length but differing in transfer orientation are formed on printing sheet 4, as shown in FIG. 11A. If the direction of external magnetization corresponds to the easy axis of magnetization of the magnetic member 40*e*, the magnetic member 40*e* has the highest intensity of the external magnetic field along the easy axis of magnetization among the magnetic members 40*e* to 40*h* and has the large Barkhausen effect at time t1 to generate a pulsed magnetic field to be detected, as shown in FIG. 11B. Similarly, the magnetic member 40*f* generates a pulsed magnetic field at time t2, the magnetic member 40*g* generates a pulsed magnetic field at time t3, and the magnetic member 40*h* generates a pulsed magnetic field at time t4. Thus, expression of four-bit information is enabled.

Further, a detection method may be used in which an alternating magnetic field is formed in a magnetic tag reader at a resonance frequency corresponding to the frequency of a magnetic member (magnetostrictive element) forming a magnetic tag, and the magnetic tag is detected through magnetostrictive vibration caused when the magnetic tag is passed through the alternating magnetic field. Also, the number of resonance points is increased to enable information of a plurality of bits to be read by the magnetic tag reader.

According to this embodiment, a tag is formed so as to have information of two or more bits to be read by a formed tag reader using the large Barkhausen effect. While information indicating whether printed image information is that of a confidential document, i.e., information expressible by one bit, is set in a formed tag in this embodiment, it is possible for the formed tag to have information of two or more bits as described above and it is therefore possible to attach further detailed secrecy management information or information other than secrecy management information to printing sheet 4.

The structure of magnetic members for recording secrecy management information will be described with reference to FIG. 12. Example structures of each of five magnetic members will be described below.

Figure 12C:
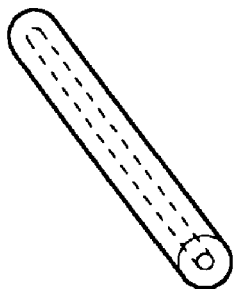
FIGS. 12A to 12E are diagrams showing examples of magnetic members in a thermal transfer sheet of Embodiment 1.
Figure 12B:
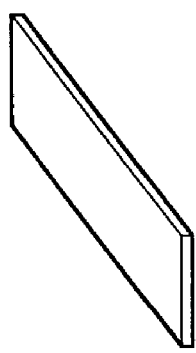
Figure 12A:
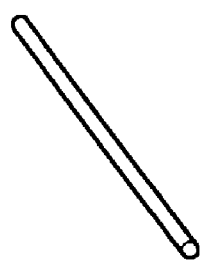

First, a magnetic member formed of a first member, such as shown in FIG. 12A, which is a Co—Fe amorphous thin metal wire (having a diameter of several ten microns and a length of 1 mm or more), is used. A magnetic member formed of a second member, such as shown in FIG. 12B, which is a Co—Fe or Fe—B amorphous thin metal film (having a thickness of several ten microns and a width and a length of 1 mm or more) different from the first member formed as a thin wire, may also be used.

Also, a magnetic member formed of a third member, such as shown in FIG. 12C, which is member formed of a Co—Fe amorphous thin metal wire (having a diameter of several ten microns and a length of 1 mm or more) and a magnetic material such as iron oxide covering the peripheral surface of the thin metal wire, may also be used. If the inner magnetic member in this double-member structure is referred to as a magnetic element and if the outer magnetic member is referred to as a biasing magnetic member, the magnetic coercive forces Hc1 of the magnetic element and Hc2 of the biasing magnetic member are set so that Hc1 is smaller than Hc2 (Hc1<Hc2) in order to obtain the following effects.

When the biasing magnetic member is not magnetized, magnetization reversal of the magnetic element alone occurs in the range: external alternating magnetic field intensity Hc1<H0 (external magnetic field)<Hc2 according to an alternating frequency. On the other hand, if each of the members in the double-member structure is magnetized by a dc magnetic field of Hc2 or higher, the above-mentioned magnetization reversal of the magnetic element does not occur in the magnetization region: external alternating magnetic field intensity Hc1<H0 (external magnetic field)<Hc2. That is, no pulsed magnetic field is caused by the large Barkhausen effect. Therefore, if the applied magnetic field intensity is set so that Hc1<H0 (applied magnetic field intensity)<Hc2, the occurrence of a pulse magnetic field from the magnetic materials in a magnetic field environment can be controlled according to whether the biasing magnetic material is magnetized in advance. That is, if the basing magnetic material is demagnetized (Hc2=0), the magnetic element is magnetized by the external magnetic field to generate a pulsed magnetic field through the large Barkhausen effect. On the other hand, if the basing magnetic material is magnetized, the magnetic element cannot be magnetized by the external magnetic field such that no pulsed magnetic field is generated as a result of the large Barkhausen effect. Therefore, if the biasing magnetic member is magnetized in order to permit removal of a confidential document, a magnetic tag, if any, formed on the printing sheet cannot react with a formed tag reader, that is, activation of the sensors by the tag can be prevented. If a finite confidential document designation period is set, and if the time at which the confidential document is checked is within the set period, the biasing magnetic member is demagnetized to enable generation of a pulsed magnetic field. If the checking time is after the end of the period, the basing magnetic member is magnetized to prevent reaction with the formed tag reader.

Magnetic members 40 in a magnetized state are contained in the thermal transfer sheet 24. Magnetization and demagnetization of the magnetic members 40 is performed by a magnetizing/demagnetizing device (not shown) as required.

Figure 12E:
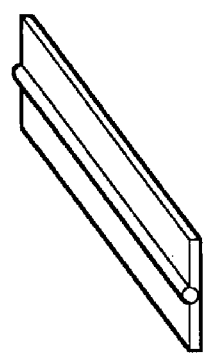
Figure 12D:
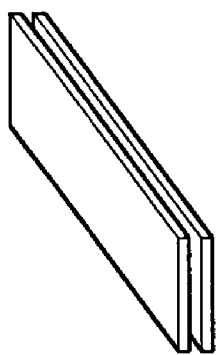

A magnetic member formed of a fourth member, such as shown in FIG. 12D, which is member formed of an amorphous metal thin film (having a thickness of several ten microns and a width and a length of 1 mm or more) and a magnetic thin film of iron oxide or the like (having a thickness of about several ten microns), may also be used. The coercive force Hc1 of the amorphous thin metal film is set smaller than the coercive force Hc2 of the thin magnetic film to obtain the same effect as that of the above-described third member.

A magnetic member formed of a fifth member, such as shown in FIG. 12E, which is member formed of an amorphous thin metal wire (having a thickness of several ten microns and a width and a length of 1 mm or more) and a magnetic thin film of iron oxide or the like (having a thickness of about several ten microns), may also be used. The coercive force Hc1 of the amorphous metal thin film is set smaller than the coercive force Hc2 of the magnetic thin film to obtain the same effect as that of the above-described third member.

Magnetic members for use in this embodiment may be formed as described above. A selection from the magnetic members with respect to the structure maybe made according to the need for demagnetization or the content of additional information to be expressed. A wire member is not substantially noticeable. If a thin film plate is used, it is effective to use the above-described dummy pattern. While two magnetic members having different coercive forces are illustrated in FIGS. 12C to 12E, the magnetic member structure is not limited to the two-member type and a combination of three or more magnetic members may be used if selection of permission/inhibition of read with a formed tag reader is possible.

Thin magnetic materials or wires maybe formed as fine particles and mixed in magnetic ink or magnetic toner to enable recording of remotely readable additional information in an image forming process. In such a case, however, it is necessary that magnetic members formed as fine particles have a remotely readable magnetic characteristic. From consideration of a demagnetizing field, it is necessary that the ratio of the thickness (wire diameter) and the length of the fine particles be at least 1:100 or higher. For example, if the wire diameter is 1 μm, a length of at least 100 μm is required. Other embodiments of the present invention will be described as an example of application of such fine particles to a device.

Embodiment 2

Figure 13:
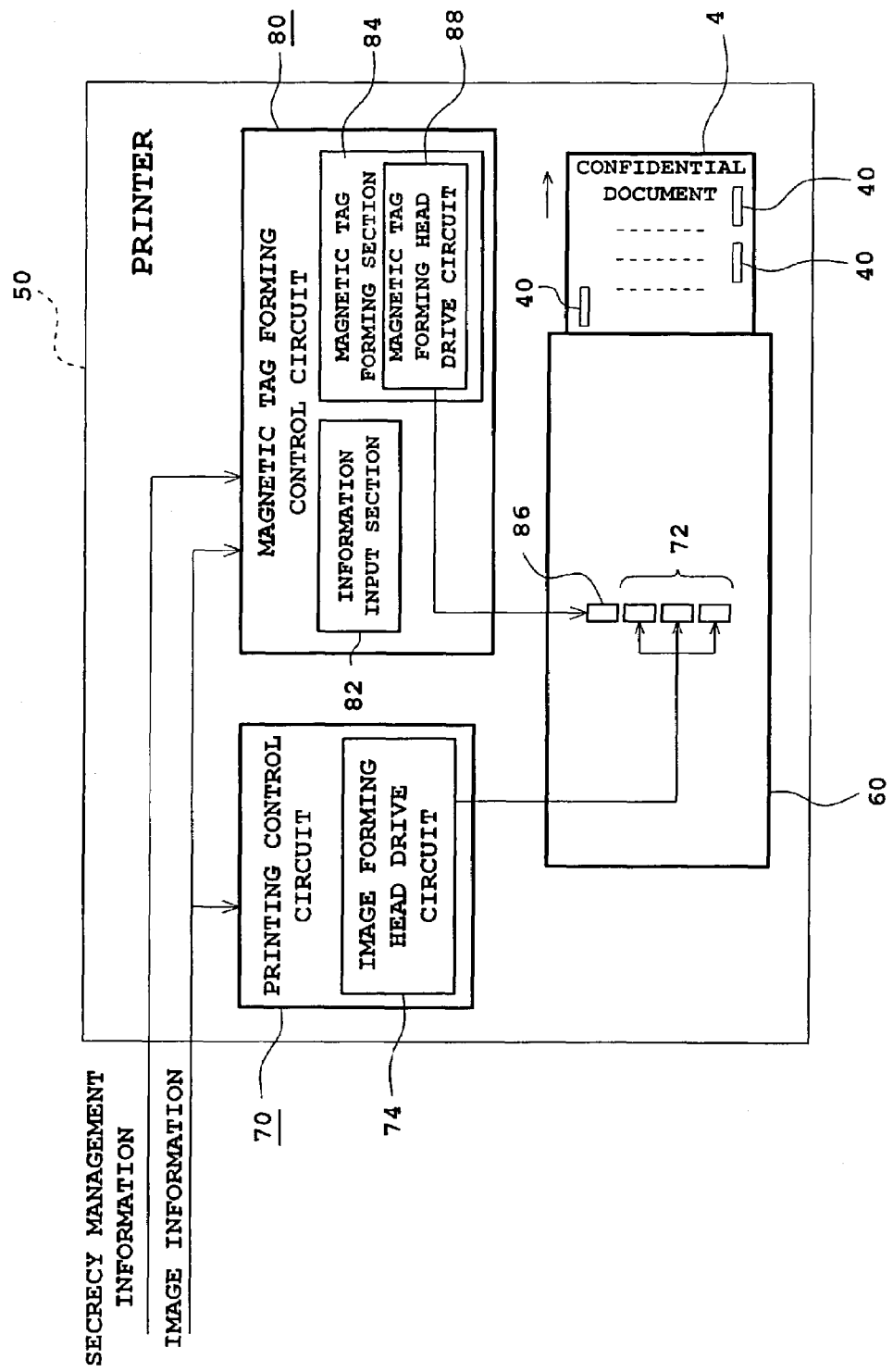
FIG. 13 is a diagram showing the configuration of a secrecy management information recording device according to an Embodiment 2 of the additional information recording device in accordance with the present invention.
Figure 14:
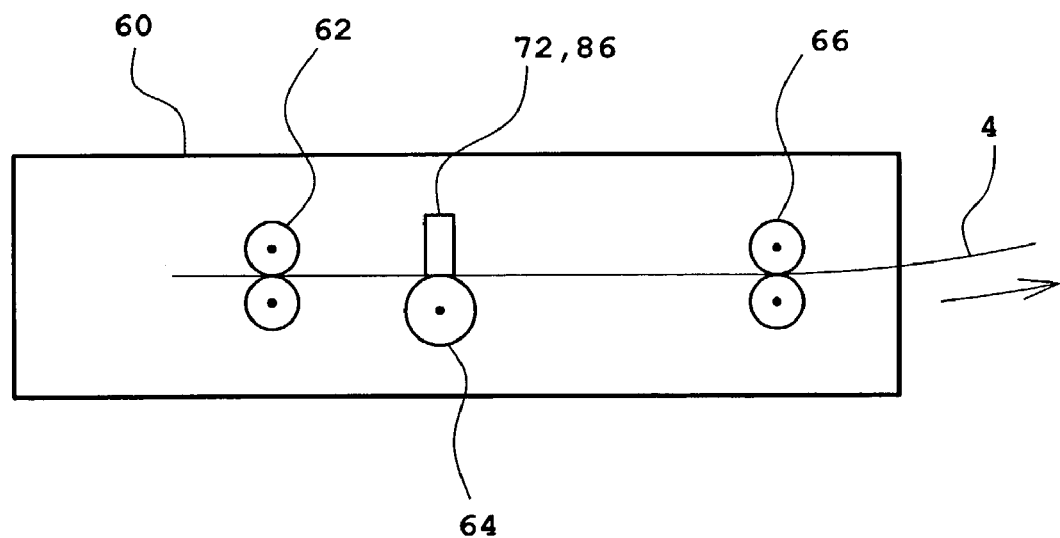
FIG. 14 is a diagram schematically showing a transport mechanism of the secrecy management information recording device shown in FIG. 13.

FIG. 13 is a diagram showing a printer. FIG. 14 is a diagram schematically showing the structure of a sheet transport mechanism portion of the printer. If FIG. 13 is a plan view, FIG. 14 is a side view of the mechanism. In the above-described Embodiment 1, the secrecy management information recording device is formed as a single unit and externally attached to the printer. This embodiment is characterized in that an arrangement required as a secrecy management information recording device is incorporated in a printer to be integrally combined with the printer.

Components of the printer 50 illustrated in FIG. 13 are a transport mechanism 60 which transports printing sheet 4, a printing control circuit 70 which performs control on drive of the transport mechanism 60 and drive control performed essentially on image forming processing, etc., in the printer, a magnetic tag forming control circuit 80 which performs control on forming of secrecy management information, etc., and a magnetic tag forming head 86. As the arrangement in the printer 50 other than the magnetic tag forming control circuit 80 and the magnetic tag forming head 86, the corresponding conventional arrangement can be used without modification. The printing control circuit 70 has an image forming head drive circuit 74 for performing drive control of an image forming head 72 essentially provided in the printer 50 to print a color image. The magnetic tag forming control circuit 80 is a circuit corresponding to the control circuit 20 in Embodiment 1. The magnetic tag forming control circuit 80 has an information input section 82 and a magnetic tag forming section 84 similar to the corresponding components of Embodiment 1. However, the magnetic tag forming section 84 has a magnetic tag forming head drive circuit 88 which performs drive control of the magnetic tag forming head 86 for printing a magnetic tag on printing sheet 4. Drive control of the magnetic tag forming head 86 may be performed in the same manner as drive control of the image forming head 72. Positioning of the magnetic tag forming head 86 is performed based on image information and secrecy management information.

In the transport mechanism 60 are provided a pair of sheet feed rollers 62 for feeding printing sheet 4 in a direction toward a place where the heads 72 and 86 are provided, a guide roller 64 placed in such a position as to face the heads 72 and 86, a pair of sheet discharge rollers 66 for discharging printing sheet 4 after image printing on the sheet, and the heads 72 and 86. Printing sheet 4 passes between the pair of sheet feed rollers 62, between the heads 72 and 86 and the guide roller 64, and between the pair of sheet discharge rollers 66 to be discharged out of the transport mechanism 60. In FIG. 13 the rollers 62, 64, and 66 are not shown.

While in Embodiment 1 a magnetic tag is formed on a printing sheet by thermally transferring a magnetic member, Embodiment 2 is an example of a device in which magnetic ink formed of a magnetic material is used and secrecy management information is formed simultaneously with image formation. The operation in this embodiment will be described briefly. When a printing request externally supplied is accepted, the printing control circuit 70 drives the image forming head 72 based on image information identified from the printing request, and prints an image on printing sheet 4. Meanwhile, the magnetic tag forming control circuit 80 prints a magnetic tag 40 on printing sheet 4 by driving the magnetic tag forming head 86 based on secrecy management information identified from the printing request so that the magnetic tag forming head 86 ejects magnetic ink. At this point, the magnetic tag forming control circuit 80 prints the magnetic tag 40 at a position where no image portion is formed, by referring to the image information. Thus, the secrecy management information can be printed simultaneously with the image on printing sheet 4 discharged from the printer 50.

As described above, different groups of information are respectively printed with the printing heads 72 and 86, and the printing heads 72 and 86 can be independently driven by their respective control circuits 70 and 80. If the heads 72 and 86 are driven completely independently of each other, they may be provided inside the transport mechanism 60 in such positions that no mutual interference occurs therebetween. In such a case, either of image information or secrecy management information may be printed before the other, because the printing positions of the heads are different from each other. Four heads 72 and 86 may be disposed side by side and operated in a linked relationship, although complicated drive control may be required.

According to this embodiment, the device is integrally combined with a printer so as to simplify construction, and arranged so as to enable formation of secrecy management information at any position on printing sheet 4, at such a position that the material for the secrecy management information is unnoticeable or does not reduce the image quality, as in Embodiment 1.

Embodiment 3

Figure 15:
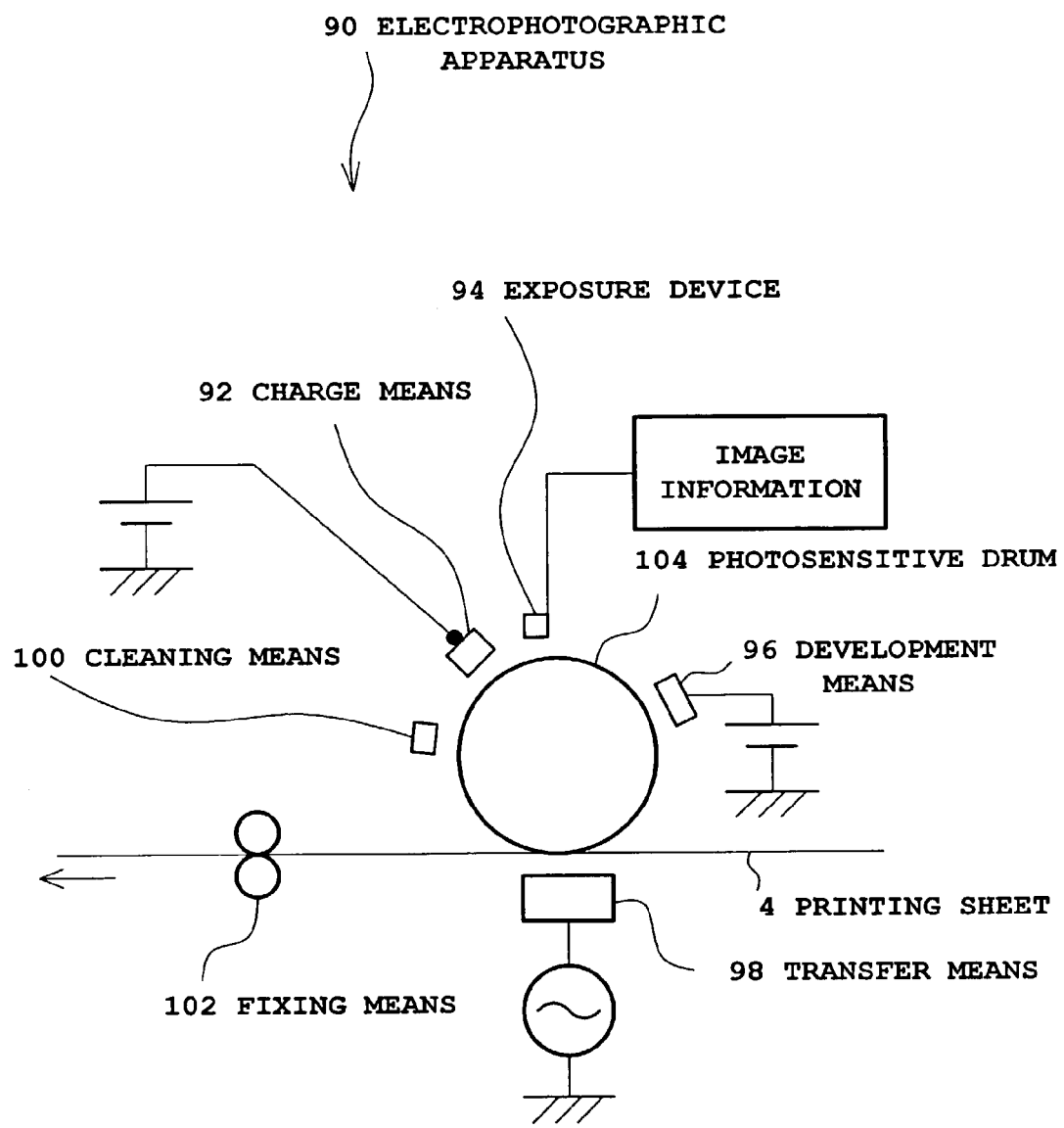
FIG. 15 is a diagram showing the construction of an electrophotographic apparatus according to an Embodiment 3 of the additional information recording device in accordance with the present invention.

While an integral-printer type arrangement is provided in Embodiment 2, Embodiment 3 described below with reference to FIG. 15 is an application of the present invention to an electrophotographic apparatus which finds wide use as a printer.

In an electrophotographic apparatus 90 are ordinarily arranged components for image forming: a charge means 92, an exposure device 94, a development means 96, a transfer means 98, a cleaning means 100, and a fixing means 102. The exposure device 94 forms an electrostatic latent image on a photosensitive drum 104 according to image information. An image formed of toner by the development means 96 is formed on the photosensitive drum 104. This image is transferred onto printing sheet 4 by the transfer means 98 to form the desired image. If magnetic toner is used as the above-mentioned toner, a magnetic pattern according to secrecy management information can be easily formed at an arbitrary position on printing sheet 4.

In each of the above-described embodiments, a magnetic tag is formed on a printing sheet separately from image information. In this embodiment, toner itself, forming an image, is magnetized to enable the image itself to function as a magnetic tag.

Embodiment 4

In this embodiment, an image forming apparatus is formed not as a printer but as a scanner. A secrecy management information recording device substantially identical in configuration to that of Embodiment 1 shown in FIGS. 1 and 2 is used. Therefore no illustration is provided for this secrecy management information recording device. The scanner in this embodiment has means for outputting onto a printing sheet and has the functions of scanning an original confidential document and outputting a copy of the contents of the document onto a printing sheet. In Embodiment 1, secrecy management information is added to image information identified from a printing request to a printer. In contrast, in this embodiment, only image information is processed by being read with the scanner and no secrecy management information is provided in the image information to be printed. This embodiment is characterized in that addition of secrecy management information to image information, even image information which theretofore included no secrecy management information, becomes possible. The operation in this embodiment will be described. When a confidential document is scanned by the scanner to make a copy thereof, the information input section of the secrecy management information recording device receives secrecy management information designated and input by an operator. For example, the operator operates a predetermined button provided on the secrecy management information recording device or a key button displayed on a display screen provided on the secrecy management information recording device to input an instruction designating addition to a copy sheet of secrecy management information indicating that the document presently scanned is a confidential document. Although this description assumes that flag information indicating whether or not the scanned document is a confidential document is used, information of two or more bits can also be designated and input, as described above.

When secrecy management information is input, the information input section of the secrecy management information recording device receives the printing sheet discharged from the scanner and forms a magnetic tag on the printing sheet according to the content of the secrecy management information designated and input by the operator, as described in Embodiment 1. Details of the processing for forming this information are the same as those in Embodiment 1 and the description of them will not be repeated.

According to this embodiment, secrecy management information can be manually added to a copy based on image information to which no secrecy management information has been added. The method of manually adding secrecy management information as described above in the description of this embodiment can be applied to an image forming apparatus formed as a printer as well as to an image forming apparatus formed as a scanner.

In the examples used to illustrate the embodiments of the present invention, secrecy management information is treated as additional information and the present invention is applied to a secrecy management information recording device. However, it is not necessary to limit additional information to secrecy management information. Any desired information can be treated as additional information, and the additional information recording device in accordance with the present invention may be applied to any desired and appropriate apparatus.

What is claimed is:

1. A device for recording additional information on a printing medium, said device comprising:
   information input means for inputting image information processed by an image forming apparatus to be printed, and additional information corresponding to the image information; and
   additional information forming means for forming, on the printing medium on which the corresponding image information is printed, a magnetic tag according to content of the additional information input by said information input means,
   wherein the additional information corresponding to the image information is remotely readable from the magnetic tag recorded on the printing medium, and
   wherein the additional information forming means express the content of the additional information through control of a magnetic field from at least one magnetic member contained in the magnetic tag or through the placement of the magnetic member.

2. The device according to claim 1, wherein said additional information forming means form the magnetic tag so that the magnetic tag can be remotely sensed through magnetostrictive vibration accompanying resonance at a frequency set in the magnetic member.

3. The device according to claim 1, wherein said additional information forming means form the magnetic tag so that a pulsed magnetic field generated from the magnetic member by the large Barkhausen effect can be remotely sensed.

4. The device according to claim 1, wherein said additional information forming means determine a position at which the magnetic tag is formed on the printing medium based on the position on the printing medium at which the image information input by said information input means is printed.

5. The device according to claim 4, wherein said additional information forming means form a magnetic tag on the reverse surface of the printing medium.

6. The device according to claim 1, further comprising dummy pattern forming means for forming a dummy pattern comprising at least one magnetic member on the printing medium based on the placement of the magnetic member on the printing medium.

7. The device according to claim 1, wherein said additional information forming means have:
a thermal transfer sheet containing at least one magnetic member; and
a transfer mechanism which transfers the magnetic member contained in the thermal transfer sheet onto the printing medium in a placement pattern according to the content of the additional information.

8. The device according to claim 7, wherein said thermal transfer sheet has a multilayer structure formed by a sheet base layer, a heat-fusible layer, and an adhesive layer in which the magnetic member is provided.

9. The device according to claim 8, wherein said thermal transfer sheet is divided into regions having boundaries defined at predetermined intervals in the printing medium transport direction and perpendicular to the printing medium transport direction; at least one magnetic member is contained in each divided region; and said transfer mechanism performs thermal transfer with respect to each divided region.

10. The device according to claim 9, wherein said transfer mechanism expresses the content of the additional information by thermally transferring magnetic members at least one of which has a different length onto the printing medium.

11. The device according to claim 10, wherein said thermal transfer sheet contains magnetic members at least one of which has a different length.

12. The device according to claim 9, wherein said transfer mechanism expresses the content of the additional information by thermally transferring magnetic members, at least one of which is oriented in a different direction, onto the printing medium.

13. The device according to claim 12, wherein said thermal transfer sheet contains magnetic members at least one of which is oriented in a different direction.

14. The device according to claim 1, wherein said magnetic member is formed by a thin wire.

15. The device according to claim 1, wherein said magnetic member is formed by a thin film.

16. The device according to claim 1, wherein said magnetic member is formed by at least two magnetic materials differing in magnetic coercive force.

17. The device according to claim 1, wherein said information input means designate and input the additional information corresponding to the image information to be printed.

18. The device according to claim 1, wherein said additional information forming means form the magnetic tag on the printing medium by ejecting magnetic ink containing a magnetic material.

19. The device according to claim 1, wherein said additional information forming means form the magnetic tag on the printing medium by transferring and fixing magnetic toner containing a magnetic material.

20. The device according to claim 1, wherein said device is detachably attached to the image forming apparatus.

21. An image forming apparatus comprising:
an additional information recording device having information input means for inputting image information processed by said image forming apparatus to be printed, and additional information corresponding to the image information, and additional information forming means for forming, on the printing medium on which the corresponding image information is printed, a magnetic tag according to content of the additional information input by said information input means; and
a main unit for combining with said additional information recording device;
wherein the additional information forming means express the content of the additional information through control of a magnetic field from at least one magnetic member contained in the magnetic tag or through the placement of the magnetic member.

22. A method of recording additional information on a printing medium, said method comprising:
an information input step of inputting image information processed by an image forming apparatus to be printed, and additional information corresponding to the image information; and
an additional information forming step of forming, on the printing medium on which the corresponding image information is printed, a magnetic tag according to content of the input additional information,
wherein the additional information corresponding to the image information is remotely readable from the magnetic tag recorded on the printing medium,
the content of the additional information being expressed through control of a magnetic field from at least one magnetic member contained in the magnetic tag or through the placement of the magnetic member.

23. The method according to claim 22, wherein, in said additional information forming step, the magnetic tag is formed such that it can be remotely sensed through magnetostrictive vibration accompanying resonance at a frequency set in the magnetic member.

24. The method according to claim 22, wherein, in said additional information forming step, the magnetic tag is formed so that a pulsed magnetic field generated by the magnetic member due to a large Barkhausen effect can be remotely sensed.

25. The method according to claim 22, wherein, in said additional information forming step, a position at which the magnetic tag is formed on the printing medium is determined in consideration of the position on the printing medium at which the image information input by said information input means is printed.

26. The method according to claim 22, further comprising a dummy pattern forming step of forming a dummy pattern of at least one magnetic member on the printing medium in consideration of the placement of the magnetic member on the printing medium.

* * * * *